No. 683,567. Patented Oct. 1, 1901.
C. MOEHRING.
SPRING LIFT FOR DISK DRILLS.
(Application filed Aug. 2, 1901.)

(No Model.) 2 Sheets—Sheet 1.

No. 683,567. Patented Oct. 1, 1901.
C. MOEHRING.
SPRING LIFT FOR DISK DRILLS.
(Application filed Aug. 2, 1901.)

(No Model.) 2 Sheets—Sheet 2.

Witnesses:
D. W. Edelin
M. L. Adams

Inventor:
Christ Moehring
By his attys
Pennie & Goldsborough

UNITED STATES PATENT OFFICE.

CHRIST MOEHRING, OF MIDDLETOWN, OHIO, ASSIGNOR TO WILLIAM FETZER, OF SAME PLACE.

SPRING-LIFT FOR DISK DRILLS.

SPECIFICATION forming part of Letters Patent No. 683,567, dated October 1, 1901.

Application filed August 2, 1901. Serial No. 70,661. (No model.)

*To all whom it may concern:*

Be it known that I, CHRIST MOEHRING, a citizen of the United States of America, residing at Middletown, county of Butler, State of Ohio, have invented certain new and useful Improvements in Spring-Lifts for Disk Drills; and I do hereby declare the following to be a full, clear, and exact description of the invention, such as will enable others skilled in the art to which it appertains to make and use the same.

The invention relates to the mechanism for tilting the main frame and raising and lowering the disks, and it has been devised with a view to putting this mechanism more completely under the control of the driver, so as to enable him without leaving his seat and without unusual exertion to tilt the main frame as required, as well as to lift the disks clear of the ground or cause them to bear with greater force, according as the work being done or the condition of the soil requires.

The invention is illustrated in the accompanying drawings, wherein—

Figure 1:
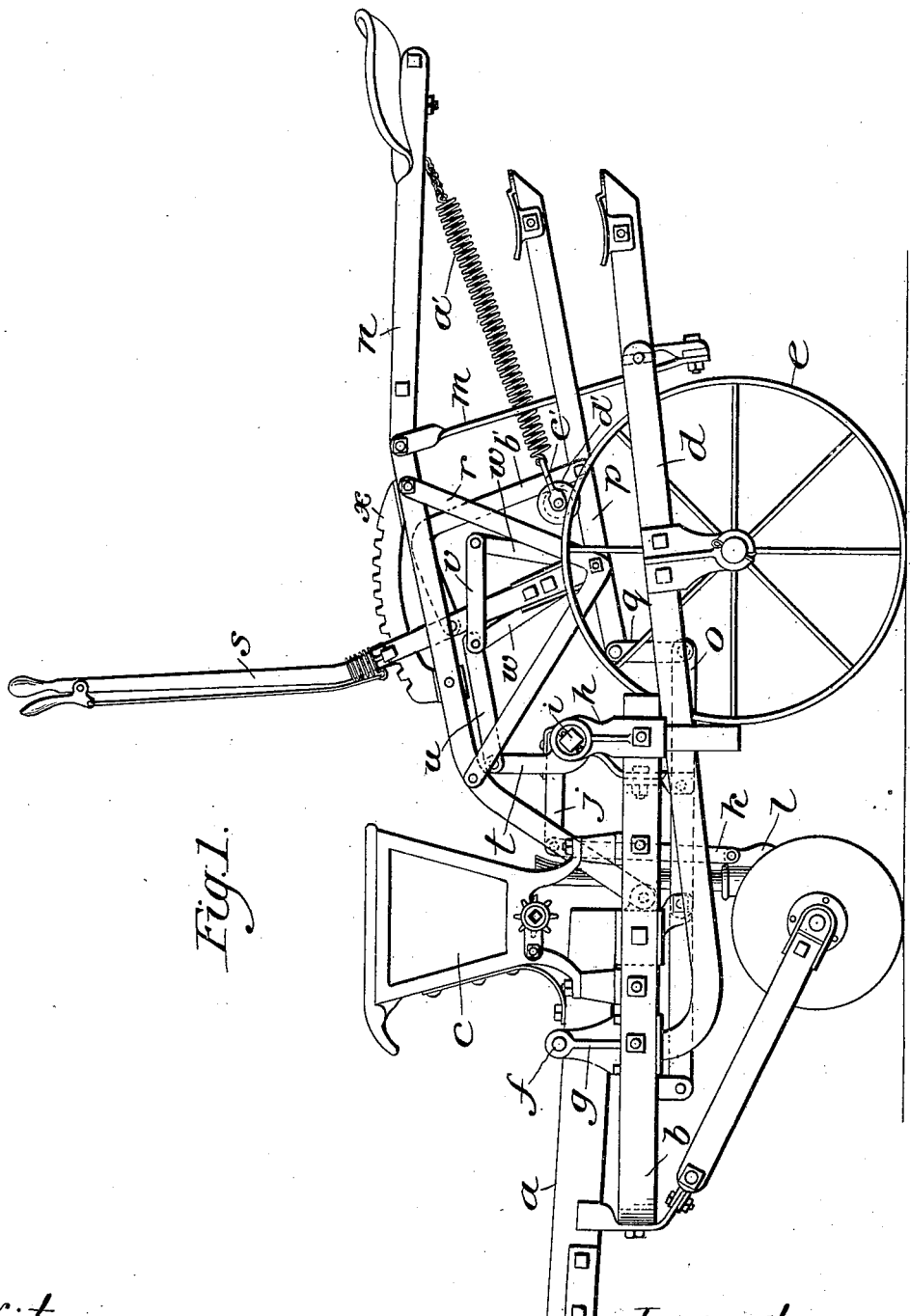
Figure 2:
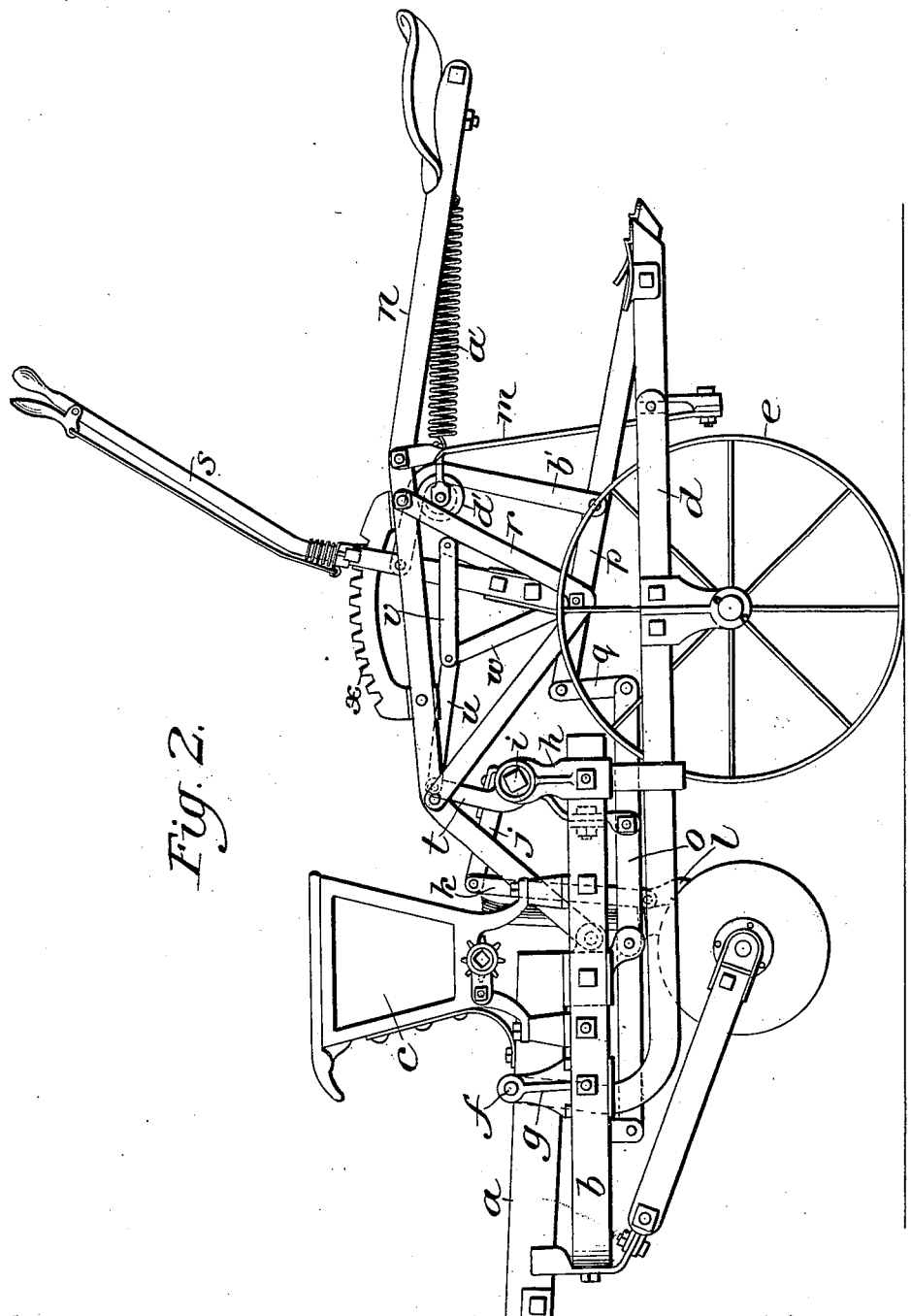

Figure 1 is a side elevation of the entire machine with the parts in position for work, and Fig. 2 is a similar view with the hand and foot levers and other parts adjusted so that the disks are off the ground.

Referring to the views, $a$ denotes the tongue, and $b$ the main frame, on which is erected the seed box $c$. This frame is carried, as usual, by the wheel-frame $d$, that is supported by the wheels $e$, the two frames being pivotally connected together at $f$ by means of pintles secured in standards $g$, rising from the main frame in front of the seedbox.

The side bars of the main frame are extended rearwardly of the seed box, and in standards $h$, mounted near their rear ends, is journaled a shaft $i$, having crank-arms $j$, that are connected by links $k$ or otherwise to the disk-castings $l$, this shaft and its connections constituting the immediate means for raising and lowering the disks.

The side bars of the wheel-frame $d$ extend rearwardly of the supporting-wheels and carry at their rear ends vertical posts or standards $m$ for supporting the seat-bar $n$. This bar is pivotally connected at its front end to any convenient part of the main frame, and after rising vertically, so as to locate the seat at the proper elevation, extends rearwardly some distance past the end of the wheel-frame.

Projecting rearward from the under side of the main frame is a rigid bar $o$, and to the rear end of this bar the foot-lever $p$ is connected by a short link $q$. The pivot of this lever is hung in the lower end of a triangular frame $r$, that is suspended from the seat-bar, so that the driver may tilt the main frame by pressing with his feet on the pedal at the rear end of the lever.

For the purpose of rocking the shaft $i$ and raising and lowering the disks a hand-lever $s$ is pivoted to the foot-lever $p$ and is connected to arms $t$ on the shaft, through the intermediacy of a link $u$ and straps $v$ $w$, which allow the lever to have a certain amount of movement before the shaft is operated and allows the disks to play freely.

On the seat-bar above the pivot of the hand-lever is a quadrant-rack $x$, and the hand-lever carries a spring-actuated locking-bolt that takes into the teeth of this rack, so as to lock the lever in any desired position of adjustment.

As thus far described the machine forms no part of the present invention except in so far as its parts enter into combination with other parts that will now be described and wherein more especially the particular improvement resides.

Although the function of the hand-lever is primarily to raise and lower the disks, it will be obvious that owing to its being pivoted to the foot-lever and connected, as already described, to the other parts it also serves to assist the foot-lever in tilting the main frame. The work is consequently great to be done by the hand-lever, and the particular object of the present invention is to lighten the labor imposed on the driver of handling it by combining with it a spring $a'$, that is so arranged that it will exert the most lifting force on the lever when the lever has the most work to do. It will be understood, of course, that when the machine is at work the lever is locked in its forward position, as shown in Fig. 1, and that when the machine is out of operation the lever is locked in its rearward position. At such times as the lever is locked the spring consequently has no effect on it; but when the latch is released the spring greatly assists the driver to pull the lever backward, and the following arrangement has been designed with the view of obtaining the necessary power from a spring of moderate tension by arranging the connections so that the leverage which the spring has on the parts changes as the difficulty of handling the lever varies.

The spring is an ordinary coiled spring and is connected at its rear end to the outer end of the seat-bar, preferably under the seat, this point of connection being, as will be understood, a fixed point with respect to the movement of the hand-lever. At its front end the spring is connected to the lever through an intermediate lever or bar $b'$, that is connected at its lower end to the foot-lever and at its upper end to the hand-lever at a point near the quadrant-rack. This intermediate lever is connected to the foot-lever some distance in the rear of the pivot of the hand-lever and extends upward parallel with the hand-lever to the point above described, where it is bent abruptly forward and is connected to the hand-lever. This lever $b'$ is the intermediacy of connection between the forward end of the spring and the hand-lever, and the only object in making it separate from the hand-lever is to provide for a shifting connection between the spring and the hand-lever. As will be seen in both the figures, the spring is immediately connected at its front end to a shackle $c'$, which straddles the intermediate lever $b'$ and carries a sheave or roller $d'$, which is free to run up and down on the intermediate lever, the front edge of the latter forming a track for the roller. The normal position of the hand-lever in the operation of the machine being inclined forward, the roller naturally rests at the lower end of the intermediate lever, as shown in Fig. 1, in which position it has the least effect on the hand-lever. The act of operating the hand-lever requires but little effort in the first part of the movement, this part of the movement not effecting the lifting of the disks, but only serving, in coöperation with the foot-lever, to tilt the main frame. When, however, the hand-lever contacts with the rearmost one of the straps $w$, the real work of lifting the disks begins, and when the lever has reached this position the roller has traveled up the intermediate lever and greatly increased its leverage on the hand-lever, owing to its greater distance from the lever's pivot.

If the spring were connected to the hand-lever at a fixed point, it would exert an approximately constant tension on it, and it would be necessary to employ a spring of greater stiffness in order to insure the necessary power at the proper time. Such springs are, however, expensive, and, moreover, would be impracticable, for the reason that they would have to be made so strong that the hand-lever would be uncontrollable in the early part of its movement; but by the use of the automatically-shifting point of connection above described between the lever and the spring I am enabled to produce the desired effect by a much lighter and less expensive spring.

It is to be noted that the spring is actually stretched more when the sheave is at its lowermost position than when it has traveled up the intermediate lever; but as the leverage of its point of connection with the hand-lever increases as the spring tension diminishes the result is that an approximately uniform lifting force is at all times exerted. It is also to be noted that when the sheave $d'$ nears the lower end of the lever $b'$ the altered inclination of the spring causes it to pull upward on the frame-bar $o$, thereby tending slightly to depress the front end of the main frame and assist in getting the disks down and into the ground.

Having thus described my invention, what I claim as new, and desire to secure by Letters Patent, is—

1. The combination of the hand-lever, and a spring connected at one end to a fixed point on the machine, the opposite end of the spring having a movable connection with the lever so that the point of application of the spring force upon the lever changes automatically as the lever moves.

2. The combination with the seat-bar and the hand-lever, of a spring secured at its rear end to the bar, and having a movable connection with the lever at its opposite end.

3. The combination with the seat-bar, and the hand and foot levers, of an intermediate lever connected to said hand and foot levers, and a spring secured at one end to the seat-bar and having a movable connection at its other end with the intermediate lever.

4. The combination with the seat-bar, and the hand and foot levers, of an intermediate lever connected at its lower end to the foot-lever and extending upward parallel with the hand-lever and connected thereto at its upper end, a roller free to travel up and down on said intermediate lever, and a spring secured at its rear end to the seat-bar and at its front end to the roller.

5. The combination with the hand and foot levers, and the seat-bar extending rearwardly of the hand-lever, of an intermediate lever connected at its lower end to the foot-lever in rear of the hand-lever's pivot and extending upward substantially parallel with the hand-lever and connected thereto at its upper end, a roller free to travel up and down on said intermediate lever, and a spring secured at its front end to the roller and extending rearward underneath and along the seat-bar and connected at its rear end to said bar.

In testimony whereof I affix my signature in presence of two witnesses.

CHRIST MOEHRING.

Witnesses:
   WILLIAM FETZER,
   CHARLES BROOKS.